United States Patent [19]

Steckler

[11] 4,071,508
[45] Jan. 31, 1978

[54] ANIONIC HYDROGELS BASED ON HYDROXYALKYL ACRYLATES AND METHACRYLATES

[75] Inventor: Robert Steckler, San Diego, Calif.

[73] Assignee: Plastomedical Sciences, Inc., Briarcliff Manor, N.Y.

[21] Appl. No.: 549,098

[22] Filed: Feb. 11, 1975

[51] Int. Cl.$^2$ .......................................... C08F 220/20
[52] U.S. Cl. .............................. 260/79.3 MU; 71/85; 71/86; 210/38 R; 260/2.1 E; 424/167; 424/224; 424/335; 526/260; 526/263; 526/264; 526/277
[58] Field of Search .................... 260/79.3 MU, 2.1 E

[56] References Cited

U.S. PATENT DOCUMENTS

| | | | |
|---|---|---|---|
| 2,964,557 | 12/1960 | Niederhauser et al. | 260/79.3 MU |
| 3,503,942 | 3/1970 | Seiderman | 260/80.75 |
| 3,592,655 | 7/1971 | Dykstra | 260/79.3 MU |
| 3,699,089 | 10/1972 | Wichterle | 260/80.72 |
| 3,714,106 | 1/1973 | Smith et al. | 260/79.3 MU |

*Primary Examiner*—Harry Wong, Jr.
*Attorney, Agent, or Firm*—George L. Tone

[57] ABSTRACT

Novel anionic hydrogels, containing acidic groups in their molecular structure, and processes for their preparation are described. These novel hydrogels are stable three-dimensional polymer networks, having good water permeability and mechanical properties, and are obtained by simultaneous polymerization and cross-linking, in the presence of a polymerization catalyst, such as an organic peroxide, azobisisobutyronitrile or other free radical polymerization catalyst, of a mixture of (a) hydroxyalkyl acrylate or methacrylate, (b) a polymerizable acidic monomer containing a sulfonic acid, sulfate or phosphate group in its molecular structure, such as sulfo-ethyl acrylate or methacrylate or a sulfate or phosphate derivative of a hydroxyalkyl- acrylate or methacrylate, and (c) a cross-linking agent, such as a glycol diacrylate or dimethacrylate; if desired there may also be present (d) one or more additional monomers, usually an acryloid monomer such as an alkyl acrylate or methacrylate, acrylamides etc. (although other monomers such as vinyl acetate, styrene, etc. may also be used) which is copolymerizable with (a), (b) and (c). The thus obtained anionic hydrogels are useful for combining, by reaction or complexing, with materials having an opposite charge; such as basic or cationic agricultural chemicals (insecticides, herbicides, fungicides, plant growth regulators, etc.), germicides, pharmaceuticals, cosmetics, hormones, enzymes, flavors, fragrances, antiperspirants, metals and the like, both to recover such basic or cationic materials from an aqueous medium and for purifying water containing them, and also for the preparation of a complex or other combination of the anionic hydrogel with such materials which may be useful per se or from which the complexed or combined basic or cationic material may be slowly or controllably released.

6 Claims, No Drawings

ANIONIC HYDROGELS BASED ON HYDROXYALKYL ACRYLATES AND METHACRYLATES

The present invention relates to new and useful anionic hydrogels which are stable three dimensional copolymer networks, having good water permeability and mechanical properties, and are obtained by simultaneous copolymerization and cross-linking, in the presence of a polymerization catalyst, of a mixture of (a) a hydroxyalkyl- acrylate or methacrylate, (b) an anionic polymerizable monoethylenically unsaturated monomer, the acid groups of which are: sulfonic acid groups or acidic sulfate ester or phosphate ester groups, and (c) a cross-linking agent, such as a glycol diacrylate or dimethacrylate or divinyl benzene, etc.; and, (d) if desired, other monoethylenically unsaturated monomers which are copolymerizable with components (a), (b) and (c).

BACKGROUND OF THE INVENTION

A number of synthetic polymeric materials, which contain acidic groups which impart anionic functionality thereto are known in the art; possibly the most widely available and best known of such anionic synthetic resins, are the cation exchange resins available under such trade-names as Amberlite, Dowex, Permutit and Zeocarb. In general the so-called "weak" cation exchange resins contain carboxylic groups while the so-called "strong" cation exchange resins contain sulfonic groups. However, such cation exchange resins are not hydrogels.

Other anionic synthetic polymeric materials which are known in the prior art, are the self-stabilizing polymer latices obtained by emulsion polymerization techniques in which a copolymerizable surfactant is used as an emulsifier in the preparation of the aqueous emulsion of monomer(s) to be polymerized. In the course of the polymerization, these copolymerizable surfactants copolymerized with the monomer or mixture of other monomers being polymerized and become an integral part of the resulting polymer so that the polymeric material so obtained contains ionic (acidic) groups. As examples of acidic, ionic, copolymerizable surfactants which have been so used may be mentioned the polymerizable α-methylene carboxylic acid esters (e.g., the acrylic and methacrylic acid esters) of hydroxyalkane sulfonic acids such as those disclosed in U.S. Pat. Nos. 3,024,221 and 3,033,833 both to Le Fevre and Sheetz and U.S. Pat. No. 3,617,368 to Gibbs and Wessling; also the sulfate esters of hydroxyalkyl acrylates and methacrylates disclosed in my U.S. Pat. No. 3,839,393 issued Oct. 1, 1974; also the phosphate esters of hydroxyalkyl acrylates and methacrylates disclosed in my U.S. Pat. No. 3,855,364 issued Dec. 17, 1974; and the sulfates of polymerizable enthylenically unsaturated alcohols and their alkylene oxide adducts disclosed in my application Ser. No. 321,228, filed Jan. 5, 1973, now U.S. Pat. No. 3,875,202 issued Apr. 1, 1975. Such copolymerizable surfactants are also used to impart hydrophilic properties to the resulting polymer, to improve the receptivity of the resulting polymer to basic dyes and other purposes more fully described in the above patents; however, none of the polymers heretofore produced by their use have, to the best of my knowledge, been in the form of hydrogels.

Various synthetic polymeric hydrogels, including hydrogels produced by copolymerization of a mixture of monomers containing a hydroxyalkyl acrylate or methacrylate and a cross-linking agent, have also been disclosed in the prior art. As examples of cross-linked polymeric hydrogels, in the preparation of which a hydroxyalkyl acrylate or methacrylate and a cross-linking agent has been used, may be mentioned the cross-linked hydrogels disclosed in my prior U.S. Pat. No. 3,532,679 issued Oct. 6, 1974 and my copending application Ser. No. 383,275 filed July 27, 1973, now U.S. Pat. No. 3,878,175 issued Apr. 15, 1975.

While most of the known cross-linked hydrogels are neutral hydrogels and are not ionic in character, there is in U.S. Pat. No. 3,689,634, issued Sept. 5, 1972 to Kliment, Vacik, Majkus and Wichterle, entitled Protracted Activity Oral Hydrogel Bead; a broad suggestion that "it is also possible to replace the non-ionizable cross-linked hydrogels by physically similar hydrogels containing also ionizable groups"; the only examples of ionic hydrogels disclosed in this patent are: "A porous hydrogel capable of exchanging cations prepared by copolymerizing a mixture of 35 parts of methacrylic acid, and 30 parts of a 25 percent aqueous solution of maleic anhydride," disclosed in Example 8 at the top of column 8 of the patent; and "A copolymer prepared from 97 parts of ethylene glycol monomethacrylate, 2 parts of methacrylic acid and 1 percent of ethylene glycol bis-methacrylate by suspension polymerization in a concentrated, aqueous solution of sodium chloride, using 0.05 parts of diisopropyl percarbonate as a polymerization initiator," disclosed in Example 9 at the middle of column 8 of the patent. The acid groups in such anionic hydrogels disclosed in this patent are of course carboxylic acid groups. As in the case of cationic exchange resins containing carboxylic acid groups which are classified as "weak" cation exchange resins, such carboxylic hydrogels are relatively weak cation exchangers.

OBJECTS OF THE INVENTION

It is, therefore, an object of the present invention to provide a new class anionic polymeric materials, in the form of hydrogels, the acid groups of which are sulfonic acid groups or acidic sulfate ester or phosphate ester groups, having new and useful properties.

It is a further object of this invention to provide methods of making this new class of anionic hydrogels.

It is a further object of this invention to provide new and useful compositions and processes containing and/or utilizing the novel anionic hydrogels of this invention.

Other and further objects will be apparent as the present description progresses.

DETAILED DESCRIPTION OF THE INVENTION

As previously stated, the novel cationic hydrogels of the present invention are obtained by simultaneous polymerization and cross-linking, in the presence of a free radical polymerization catalyst, of a mixture of:

a. a hydroxyalkyl acrylate or methacrylate;

b. an anionic polymerizable monoethylenically unsaturated monomer the acid groups of which are sulfonic acid groups or acidic sulfate ester or phosphate ester groups, and c. a cross-linking agent; there may also be present:

d. one or more other monomers, preferably an acryloid monomer or monomers such as acrylamides or alkyl acrylates or methacrylates, although other monomers such as vinyl acetate, styrene, etc. may be used, which are copolymerizable with (a), (b) and (c).

Component (a)

The hydroxyalkyl acrylates and methacrylates, which may be used as component (a) above, are 2,3-dihydroxypropyl acrylate and methacrylate (glyceryl monoacrylate and methacrylate) and the glycol and polyglycol acrylates and methacrylates represented by the formula:

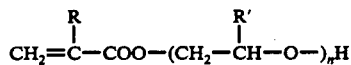

Formula 1.

wherein
R represents hydrogen or alkyl of from 1 to about 6 carbon atoms;
R' represents hydrogen or alkyl of from 1 to about 6 carbons atoms, preferably hydrogen, methyl or ethyl; and
n is an integer, preferably of from 1 to about 6, but may be substantially higher such as 25, 50 or even higher.

Such hydroxyalkyl acrylates and methacrylates may be called glycol and polyclycol monoacrylates and monomethacrylates. They are well known in the art and may be obtained by the reaction (alkoxylation) of an α-methylene carboxylic acid, preferably acrylic or methacrylic acid, with a vicinal alklene oxide, preferably ethylene oxide, propylene oxide or 1,2-butylene oxide until the desired amount of alkylene oxide have been reacted with, added on to, the α-methylene carboxylic acid. It will be appreciated that when so produced n may represent an average value corresponding to the number of moles of alkylene oxide reacted per mole of α-methylene carboxylic acid and that when a higher alkylene oxide, such as propylene oxide or butylene oxide is used some of the product may be of the formula:

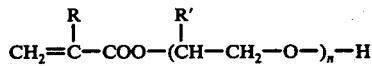

Formula 2.

but most of the product is as depicted in Formula 1. The product may also contain a small amount of unreacted α-methylene carboxylic acid; however, processes are available, such as that disclosed in my copending application Ser. No. 325,840, filed Jan. 22, 1973, now U.S. Pat. No. 3,875,211 issued Apr. 1, 1975, which yield products having only minimal amounts of unreacted acid and such relatively pure products are preferably used. Single products of Formula 1 of high purity may also be obtained by reaction of equimolar proportions of acrylic acid chloride or methacrylic acid chloride, for example, and a glycol or polyglycol such as ethylene glycol, diethylene glycol, triethylene glycol, tetraethylene glycol, propylene glycol, butylene glycol, dipropylene glycol, tripropylene glycol, butylene glycol, tributylene glycol, etc.

As examples of specific compounds of Formula 1, which may be used as component (a), may be mentioned: 2-hydroxyethylacrylate, 2-hydroxyethylmethacrylate, 2-hydroxyethyl α-chloroacrylate, 2-hydroxyethyl α-ethylacrylate, 2-hydroxyethyl α-propylacrylate, 2-hydroxyethyl α-butylacrylate, 2-hydroxyethyl α-hexylacrylate, 2-hydroxpropyl acrylate or methacrylate, 2-hydroxybutyl acrylate or methacrylate, diethyleneglycol monoacrylate or monomethacrylate, triethyleneglycol monoacrylate or monomethacrylate, tetraethyleneglycol monoacrylate or monomethacrylate, dipropyleneglycol monoacrylate or monomethacrylate, tripropyleneglycol monoacrylate or monomethacrylate, tetrapropyleneglycol monoacrylate or monomethacrylate, dibutyleneglycol monoacrylate or monomethacrylate, tributyl eneglycol monoacrylate or monomethacrylate, tetrabutyleneglycol monoacrylate or monomethacrylate and the like or mixtures thereof.

Component (b)

As component (b) — an anionic ethylenically unsaturated monomer, which is copolymerizable with component (a) and which contains a sulfonic acid, sulfate ester of phosphate ester group in its molecular structure — I may use any of the usual polymerizable or copolymerizable ethylenically unsaturated acids, which are commonly used in vinyl and related polymerizations to produce polymers and copolymers having acid functionality, in which the acid group is a sulfonic acid group, a sulfate ester group or a phosphate ester group. Such acidic monomers are employed in the form of the free acid or of their salts, e.g. as their ammonium or alkali metal, e.g. sodium or potassium, salts.

As examples of suitable polymerizable monomers which contain sulfonic acid groups may be mentioned; vinyl sulfonic acid, styrene sulfonic acid (e.g. p-vinylbenzenesulfonic acid), acrylamidoaryl sulfonic acids and acrylamidoalkyl sulfonic acids of the formula:

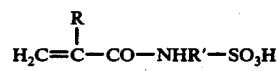

Formula 3:

wherein:
R is hydrogen or alkyl of 1 to 4 carbon atoms, and
R' is an aryl or alkyl group having at least 2 carbon atoms separating N from S.

A number of specific polymerizable acrylamido aryl sulfonic acids and acrylamidoalkyl sulfonic acids of this type are disclosed in U.S. Pat. No. 2,983,712 issued May 9, 1961 to Wilkinson; I particularly prefer the acrylamidoalkyl sulfonic acids disclosed in said patent and also U.S. Pat. Nos. 3,332,904 issued July 25, 1967 to LaCombe and Miller; U.S. Pat. No. 3,478,091 issued Nov. 11, 1969 to Murfia and Miller; and U.S. Pat. No. 3,506,707 issued Apr. 14, 1970 to Miller and Murfia, such as 2-acrylamido-2-methylpropane-1-sulfonic acid.

Another preferred class of monomers containing sulfonic acid groups are the so-called copolymerizable surfactants which are esters of polymerizable α-methylene carboxylic acids, especially acrylic or methacrylic acid, with hydroxyalkane sulfonic acids, especially isethionic acids, and which may be represented by the formula:

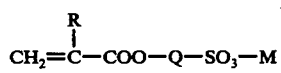

Formula 4:

wherein, R is hydrogen, halogen (e.g., chlorine or bromine), or an organic radical, preferably alkylene of from 1 to about 6 carbon atoms; Q is a bivalent organic radical having its valence bonds on two different carbon atoms, preferably alkylene of from 2 to about 6 carbon atoms; and M is a cation, e.g. ammonium, amino, alkali metal or alkaline earth metal etc. A number of such esters, of α-methylene carboxylic acids with hydroxyalkane sulfonic acids, which may be used as component (b) are disclosed in U.S. Pat. No. 3,024,221 issued Mar. 6, 1962 to Le Fevre and Sheetz; and as examples thereof may be mentioned 2-sulfoethyl-α-aacrylate, 2-sulfoethyl-α-methacrylate, 2-sulfoethyl-α-ethylacrylate, 2-sulfoethyl-α-propylacrylate, 2-sulfoethyl-α-butylacrylate, 2-sulfoethyl-α-cyclohexylacrylate, 2-sulfoethyl-α-chloroacrylate, 3-sulfo-1-propyl acrylate, 3-sulfo-1-propyl methacrylate, 3-sulfo-1-butyl acrylate, 4-sulfo-1-butyl acrylate, 4-sulfo-1-butyl methacrylate, ar-sulfophenyl acrylate, ar-sulfophenyl methacrylate, and other like esters disclosed in said U.S. Pat. No. 3,024,221. Also, the glycidyl acrylate sulfonate and glycidyl methacrylate sulfonate disclosed in U.S. Pat. No. 3,541,059 issued Nov. 17, 1970 to Shaper and in Japanese Pat. No. 73 32,089 issued Oct. 4, 1973 to Nippon Oils and Fats Co., Ltd.

As copolymerizable surfactants in which the acid group is a sulfate or phosphate group I particularly prefer the sulfate esters of hydroxyalkyl acrylates or methacrylates (or the hydroxyalkyl esters of similar α-methylene carboxylic acids) disclosed in my U.S. Pat. No. 3,839,393 issued Oct. 1, 1974; the sulfate esters of polymerizable ethylenically unsaturated alcohols and their alkylene oxide adducts disclosed in my prior application Ser. No. 321,228 filed Jan. 5, 1973; and the phosphate esters of hydroxyalkyl acrylates and methacrylates disclosed in my prior U.S. Pat. No. 3,855,364 issued Dec. 17, 1974. These types of sulfate or phosphate ester monomers may be represented, respectively, by the following general formulas:

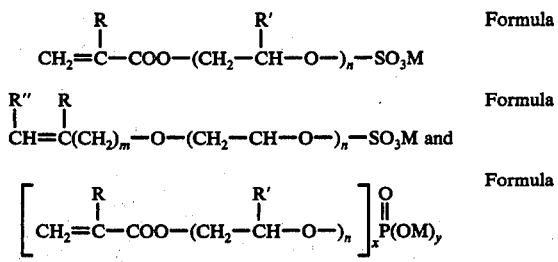

In the forgoing formulas 5, 6 and 7:
R represents hydrogen or alkyl of 1 to about 6 carbons;
R" represents hydrogen, methyl or phenyl;
R' represents hydrogen, or alkyl, preferably methyl or ethy
m represents an integer of from 1 to about 18;
n represents an integer, preferably of from 1 to about 4;
x represents an integer of from 1 to 2;
y represents an integer of from 1 to 2, provided that the sum of x and y is 2; and
M represents a cation, i. e. hydrogen, ammonium, amino, alkali metal or alkaline earth metal.

As examples of specific materials of these types may be mentioned: 2-sulfatoethyl acrylate, 2-sulfatoethyl methacrylate, 2-sulfatopropyl acrylate, 2-sulfatopropyl methacrylate, 2-sulfatobutyl acrylate, 2-sulfatobutyl methacrylate, ω-sulfatodiethyleneglycol monoacrylate, ω-sulfatodiethylenglycol monomethacrylate, ω-sulfatotriethyleneglycol monoacrylate, ω-sulfato-triethyleneglycol monomethacrylate and other analogous materials disclosed in said U.S. Pat. No. 3,839,393.

Also the sulfates of such monoethylenically unsaturated alcohols as allyl alcohol, allyl carbinol, methallyl alcohol, hexen-1-ol-6, octen-1-ol-8, undecenyl alcohol (undecen-1-ol-11), dodecen-1-ol-12, tetradecen-1-ol-14, cinnamyl alcohol and the like, and the sulfates of alkylene oxide adducts (ethylene oxide, propylene oxide or butylene oxide adducts) of the forgoing unsaturated alcohols, such as 2-hydroxyethyl ether of allyl alcohol, 2-hydroxyethyl ether of butene-1-ol-4,2-hydroxyethyl ether of undecenyl alcohol, the monoallyl ethers of di-, tri- and tetra-ethylene glycol, the monohexenyl ethers of di-, tri-, and tetra-ethylene glycol, the mono-undecenyl ethers of di-, tri-, and tetraethylene glycol, the adduct of allyl alcohol with 3 molar proportions of ethylene oxide, the adduct of cinnamyl alcohol with 3 molar proportions of propylene oxide, the adduct of cinnamyl alcohol with a mixture of three molar proportions of ethylene oxide and two molar proportions of propylene oxide, the adducts of undecenyl alcohol with 12, 20, 35 and 50 molar proportions of ethylene oxide, the adduct of allyl alcohol with six molar proportions of 1,2-butylene oxide and 12 molar proportions of ethylene oxide and analogous materials disclosed in said application Ser. No. 321,228, now U.S. Pat. No. 3,875,202.

As examples of ethylenically unsaturated monomers containing phosphate ester groups may be mentioned the phosphate monoesters and phosphate diesters of hydroxyalkyl acrylates and methacrylates, especially the mixtures of a major amount of the phosphate monoester and a minor amount of the phosphate diester of such hydroxyalkyl acrylates and methacrylates; as specific examples thereof may be mentioned the mixtures of about 55% to about 75% of the phosphates monosters of mono-, di- and/or tri-ethylene glycol monoacrylates and monomethacrylates with about 10% to about 20% of the phosphate diesters of the mono-, di-, and tri-ethylene glycol monoacrylates and monomethacrylates, and analogous materials of Formula 6 above, disclosed in my application Serial No. 321,229, now U.S. Pat. No. 3,885,364 issued December 17, 1974 and analogous unsaturated monomers containing phosphate ester groups.

Component (c)

As the cross-linking agent, component (c), I particularly prefer the alkylene glycol diacrylates or dimethacrylates and the polyalkylene glycol diacrylates and dimethacrylates, represented by the formula:

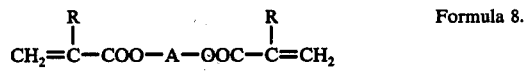

wherein,
R represents hydrogen or alkyl of 1 to 4 carbon atoms, and
A represents alkylene of from 2 to about 10 carbons or a polyglycol ether group of the formula

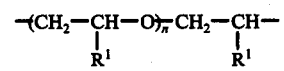

in which
$R^1$ represents hydrogen, methyl or ethyl, and
n is an integer of from 1 to about 20.

as examples thereof may be mentioned: ethylene glycol diacrylate, ethylene glycol dimethacrylate, propylene glycol diacrylate, propylene glycol dimethacrylate, diethylene glycol diacrylate, diethyleneglycol dimethacrylate, triethylene glycol diacrylate, triethylene glycol dimethacrylate, tetraethylene glycol diacrylate, tetraethylene glycol dimethacrylate, pentaethylene glycol diacrylate, pentaethylene glycol dimethacrylate, hexamethylene glycol diacrylate, hexamethylene glycol dimethacrylate, and mixtures of the forgoing. There may also be used such cross-linking agents as divinylbenzene, divinyl ether, divinyl toluene, diallyl tartrate, diallyl maleate, divinyl tartrate, N,N'-methylene-bis-acrylamide, and the like.

Component (d)

As previously stated, there may also be used, as component (d), one or more other monomers which are copolymerizable with (a), (b) and (c). When such a component (d) is used; I particularly prefer to employ such acryloid monomers as acrylamide; methacrylamide or N-(1,1-dimethyl-3-oxobutyl) acrylamide, also called diacetone acrylamide, (described in U.S. Pat. No. 3,497,467 issued Feb. 24, 1970 to Coleman); acrylonitile or an alkyl acrylate or methacrylate such as methyl acrylate, methyl methacrylate, ethyl acrylate, ethyl methacrylate, propyl acrylate, propyl methacrylate, butyl acrylate, butyl, methacrylate, hexyl acrylate, hexyl methacrylate, octyl acrylate, octyl methacrylate, lauryl acrylate, lauryl methacrylate, etc. The lower members of this series are preferred, because of greater reactivity and because larger percentages can be incorporated into the copolymers without undue reduction of the hydrophilic properties of the copolymers. However other copolymerizable monomers such as vinyl acetate, vinyl propionate, vinyl butyate, vinyl chloride, vinylidene chloride, vinyl methyl ketone, styrene, methoxystyrene, monochlorostyrene, ar-methylstyrene, ar-ethylstyrene, α,ar-dimethylstyrene, ar,ar-dimethylstyrene, vinylnaphthalene, vinyl benzoate, ethyl vinyl ether, n-butyl vinyl ether, isobutyl vinyl ether, and the like may be used if desired. Mixtures of two or more of the forgoing monomers may also be used as component (d). Heterocyclic N-vinyl monomers, such as N-vinyl pyrrolidone and N-vinyl imidazole disclosed and claimed as the base monomer for anionic hydrogels in my co-filed application Ser. No. 549,095 filed Feb. 11, 1975 may also be used as component (d) in the present invention in an amount less than the 20% by weight minimum specified in said application. It will be understood that when such a copolymerizable monomers, component (d), is employed; it can be considered as a partial replacement, modifier or extender of component (a). It therefore should not be used in an amount greater, by weight, than the amount of component (a) which is used. When such a component (d) is used, the amount of component (a) which is used should be correspondingly reduced.

Considerable variation is possible in the relative amount of each of the forgoing monomer components (a), (b) and (c), and also (d) when present, which is used and an anionic polymeric hydrogel is obtained when the mixture of such monomer components which is subjected to simultaneous polymerization and cross-linking is composed of:

| % by weight (based on total weight of all monomer components used) | Component |
|---|---|
| about 40% to about 95% | (a) the hydroxyalkyl acrylate or methacrylate; |
| about 50% to about 0.05% | (b) the anionic monomer; |
| about 0.2 to about 12% | (c) the cross-linking agent; and |
| about 0% to about 50% | (d) one or more other copolymerizable monoethylenically unsaturated monomers. |

As previously stated, when a component (d) is used, the total amount of component (d) which is used in any particular recipe should not exceed the amount of component (a) used in the same recipe; and the total amount of both component (a) and component (d) which is used should not exceed the maximum amount of component (a) (95% by weight of the total monomers) specified above. This can also be expressed "$(a) \geqq (d)$ and $(a) + (d)$ = about 40% to about 95% by weight of the total weight of all monomers used."

The fact that the anionic polymers of the present invention are hydrogels, as distinguished from a solid gel structure, I attribute primarily to the amount of component (a) — hydroxyalkyl acrylate or methacrylate-used in their preparation and only secondarily on the amount of cross-linking agent -component (c) — which is used. Within the forgoing amounts on monomer components, the cross-linking agent appears to effect the water swellability of the hydrogel. With any given recipe the swellability (expressed as water content at equillibrium at 25° C., in percent by weight), of the hydrogel ultimately obtained, decreases as the amount of cross-linking agent employed therein is increased; and is thus inversely proportional to the amount of cross-linker used.

The anionic properties of the hydrogels of the present invention is attributable to the anionic monomer — component (b) — used in their preparation. The amount of cationic materials which can be combined or complexed, with the anionic hydrogels of this invention, is therefore, directly proportional to the amount of anionic monomer used in their preparation. Thus the particular application contemplated for the anionic hydrogel and the amount of cationic material, with which it is desired that they be able to combine, will primarily determine the amount of anionic monomer — component (b) — to be used.

Polymerization and Cross-Linking

The simultaneous polymerization and cross-linking to make the hydrogels of the present invention may be carried out by various techniques known in the art. Thus the polymerization and cross-linking may be effected by bulk polymerization of a mixture of the several monomer components (a), (b), (c), and (d) and (e) if desired, in the proportions given above, in the presence of a free radical polymerization catalyst such as any of the well known inorganic or organic peroxides, azobisisobutyronitrile, etc. polymerization catalysts.

Such catalysts may be employed in the range of about 0.05 to about 4% of the total monomers. The preferred amount of catalyst is about 0.1 to about 2.0% of the monomer components. Typical catalysts include MEK peroxide (methyl ethyl ketone peroxide), lauroyl peroxide, t-butyl-peroctoate, benzoyl peroxide, isopropyl percarbonate, cumene hydroperoxide, dicumyl peroxide, azobisiso-butyronitrile, potassium persulfate, potassium peroxide, etc. Irradiation, as by ultraviolet light or gamma rays, also can be used to catalyze the polymerization and cross-linking.

The polymerization and cross-linking may be effected at temperatures in the range of 20° C. to 100° C. or somewhat higher, preferably in the range of 35° C. to about 60° C., until most of the polymerization is effected, followed by a post-cure at about 100° C to about 125° C. for about an hour.

Advantageously, the polymerization and cross-linking may be effected by the use of a casting technique of the type described in my said U.S. Pat. No. 3,532,679 in which a mixture of the monomer components, catalyst and, if desired, a mold release agent is deaerated, as by the application of vacuum until air bubbles no longer rise to the surface, poured into a suitable mold, such as a polymerization tray or cell, which is then sealed and held at a suitable temperature, as by placing in a circulating air oven or heating bath, until a hard polymer is obtained. The hard polymer so obtained may be further cured by heating to a somewhat higher temperature, than that used for the polymerization, such as 100° C to 125° C for about an hour. The cell is then opened and the cured polymer removed therefrom. The mold may be in the shape of the desired product or the solid polymer may be fabricated, after curing, into the desired shape; e.g., it may be ground into a powder or cut into the desired shape. Such polymerization and cross-linking may also be carried out in the manner described in my said copending application Ser. No. 385,275, filed July 27, 1973 wherein a solution of the several monomer components in an inert, nonpolar hydrophobic liquid such as silicone liquid, hexane, octane, mineral oil, toluene, xylene, etc. is simultaneously polymerized and cross-linked; whereby the polymer can ultimately be obtained in a porous or spongy or foamy form.

It will also be understood that the simultaneous polymerization and cross-linking may be effected, employinging solvent polymerization techniques, in the presence of water-soluble solvents in which the monomer components (a), (b), (c), (d) and (e) are soluble. Such solvents include the lower aliphatic alcohols such as methanol, ethanol, propanol and isopropanol; acetone, dioxane, ethylene glycol, glycol esters or ethers etc. By such procedures the polymer is obtained in the form of an organogel from which the organic solvent may be removed by washing with water or by distillation or evaporation.

The polymer so obtained by casting may then be immersed in water and thereby gradually swollen into a hydrogel. In the case of polymers produced in a casting technique involving the use of either a hydrophobic or water soluble solvent and which thus still contain the solvent, the solvent is displaced by the water during the immersion. Such displacement of the solvent by the water may be speeded up by kneading or squeezing the polymer during the swelling, as by passing it between squeeze rollers. The swelling in water is continued until equilibrium is reached, or until a hydrogel containing the desired amounts of water is reached. The anionic hydrogels so obtained are soft pliable materials which can be reacted with cationic materials.

It will be appreciated that polymeric products having a predetermined shape may be obtained by the use of molds of the desired shape. Thus, a product having a definite curved shape may be obtained by casting between a pair of curved glass sheets. Rods may be obtained by casting and curing in glass or plastic (e.g. nylon or polyethylene) tubes. Hollow tubes can be cast between two concentrically disposed glass tubes or by centrifugal casting procedures under polymerization conditions.

Further details of the present invention are illustrated in the specific examples which follow of preferred embodiments thereof. In these examples the polymeric anionic hydrogens were prepared employing a conventional type casting cell prepared by inserting a soft and flexible, 3/16 inch thick, vinyl gasket between two pieces of $8 \times 12 \times \frac{1}{4}$ inch polished plate glass, the gasket being positioned about one inch from the edge of the glass sheets. The glass plates were then clamped with spring type clamps, such as one inch binder clips or spring loaded clamps. The size of the cell is not critical but will depend on the size of cast sheet desired and any size limitations of the oven or heating bath to be employed. For laboratory preparations I have found glass sizes of up to 16 × 16 inches to be convenient. The thickness of the gasket should be about 20–30% greater than the desired thickness of the final cast sheet and round, square or rectangular gaskets with sides or diameter of from about 0.8 inch to about 0.5 inch may be used to control sheet thickness. Rods may conveniently be cast in sealed glass, nylon, polyethylene, etc., tubing of approximately $\frac{1}{2}$ inch diameter and 12 inches - 18 inches long.

The casting mixture consisting of monomers, catalyst, mold release agent or other additives if desired, was deaerated by application of vacuum until air bubbles no longer rose to the surface. The deaerated casting mixture is then poured into the casting cell which is then sealed and placed horizontally on a shelf in a circulating air oven equipped with constant temperature control. Unless otherwise specified it was kept in this oven at 50°–55° C. until substantially polymerized, usually in 18–48 hours. The temperature is then raised gradually (over 2–4 hours) to approximately 100° C, and polymerization completed during 1 to 3 hours at 100°–125° C. The mold was allowed to cool to room temperature, the clips removed, and the mold pried open to release a clear, colorless and rigid sheet.

EXAMPLE 1

To a 1 liter, three neck flask equipped with a mechanical stirrer, nitrogen line and vacuum line there was charged the following reactants:
90 grams of 2-hydroxyethyl methacrylate,
10 grams of the sodium salts of a mixture of about 75% of the phosphate monoester and 25% of the phosphate diester of 2-hydroxyethyl methacrylate i.e. the products of the formula (in which $x + y = 3$, with about 75% of $x = 1$ the balance of $x$ being 2)

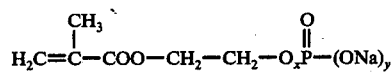

0.4 grams of tetraethyleneglycol dimethacrylate, and 2 grams of MEK peroxide containing 11.5% active oxygen (LUPERSOL DSW, obtained from Lucidol Division, of Pennwalt Corp.).

The flask was thoroughly purged with nitrogen while stirring to effect solution and vacuum was then applied until gas bubbles no longer rose to the surface. The solution in the flask was then poured into a laboratory size glass casting cell consisting of two pieces of 8 × 12 × ¼ inch plate glass, clamped to a 3/16 inch thick soft vinyl gasket. The filled mold was sealed and laid horizontally on the shelf in a circulating air oven equipped with constant temperature control and maintained at 60° C. for 40 hours. Polymerization and cross-linking was then continued by gradually raising the temperature of the oven to 100° C. over a three hour period and holding at this temperature for 1 hour. The mold was removed from the oven and allowed to cool to room temperature, the clamps removed and the mold then pried open. The thus obtained clear, rigid, hard sheet was then immersed in water and allowed to swell until equilibrium had been reached. The thus obtained hydrogel was a tough pliable material, the water content of which, at equilibrium at 25° C., was 28.4%, by weight.

EXAMPLE 2

The procedure of Example 1 was repeated using the following charge of reactants:
90 grams of 2-hydroxyethyl methacrylate,
10 grams of the ammonium salt of the sulfate ester of 2-hydroxyethyl methacrylate, i.e. the product of the formula:

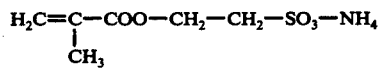

0.4 grams of tetraethyleneglycol dimethacrylate, and
2 grams of MEK peroxide, 11.5% active oxygen
The soft, pliable hydrogel ultimately obtained had a water content of 47.8% by weight at equilibrium at 25° C.

EXAMPLE 3

The procedure of Example 1 was repeated using the following charge of reactants:
50 grams of 2-hydroxyethyl methacrylate
50 grams of the ammonium salt of the sulfate ester of 2-hydroxyethyl methacrylate,
0.8 grams of tetraethyleneglycol dimethacrylate, and
1.0 grams of MEK peroxide, 11.5% active oxygen
The very soft, flexible hydrogel ultimately obtained had a water content of 93.3% by weight at equilibrium at 25° C.

EXAMPLE 4

The procedure of Example 1 was repeated using the following charge of reactants:
50 grams of 2-hydroxyethyl methacrylate,
50 grams of the ammonium salt of the sulfate ester of 2-hydroxyethyl methacrylate,
0.8 grams of ethylene glycol dimethacrylate, and
1 gram of MEK peroxide, 11.5% active oxygen.
A clear hard polymer was obtained which became tough and flexible during immersion and swelling in water.

Samples of the hydrogels of Examples 1, 2, 3 and 4 readily combine with basic (cationic) materials when placed in aqueous solutions of the basic material.

It will be understood that the forgoing examples are illustrative only of the present invention are not to be interpreted as limiting the invention. A wide variety of anionic hydrogels can readily be prepared employing other specific reactants of the type heretofore specified in the proportions specified. Additional specific recipes useful for the production of anionic hydrogels by the process of Example 1, or analogous procedures, are given immediately below in tabular form.

TABLE 1

| | COMPONENT | Recipe | 1 | 2 | 3 | 4 | 5 | 6 | 7 | 8 |
|---|---|---|---|---|---|---|---|---|---|---|
| (a) | 2-Hydroxyethyl methacrylate | | | 65 | | 90 | 25 | 40 | 95 | 50 |
| | 2-Hydroxyethyl acrylate | | 95 | | | | 25 | | | |
| | 2,3-Dihydroxypropyl methacrylate | | | | 90 | | | | | 10 |
| | Glycidyl methacrylate | | | | | | | | | 20 |
| | Beta sulfoethyl methacrylate | | 5 | 35 | | | | | | |
| | Glycidyl methacrylate sulfonate | | | | 10 | | | | | |
| (b) | Sodium salt of 2-methacrylamido-2-methylpropane-1-sulfonic acid | | | | | | 10 | | | |
| | 2-Hydroxyethyl methacrylate Phosphate | | | | | | | 50 | 40 | |
| | Sodium vinyl sulfonate | | | | | | | | 5 | 10 |
| (c) | Polyethylene glycol 400 dimethacrylate | | .2 | .8 | .1 | .1 | .1 | .3 | .1 | .8 |
| | Acrylamide | | | | | | | 10 | | |
| (d) | Methyl Acrylate | | | | | | | 10 | | |
| | Methyl methacrylate | | | | | | | | | 10 |
| | Water | | | | | 40 | | | 20 | 30 |
| Catalyst | Methyl ethyl ketone peroxide [1] | | 1.0 | 1.5 | | | 2 | 2 | 1 | |
| | Isopropyl percarbonate | | | | .6 | .1 | | | | |
| | Azobis-isobutyronitrile | | | | | .6 | | | | .5 |

[1] - LUPERSOL DSW, 11.5% active oxygen, from Lucidol Division of Pennwalt Corp.

The thus obtained anionic hydrogels of the present invention have a variety of applications in the arts. As previously stated they may readily be combined, by reaction or complexing, with materials having a basic (cationic) group or groups. Such combination with basic materials may be effected by immersing or swelling the anionic hydrogel in an aqueous solution or suspension of the basic material which it is desired to combine or complex therewith. Alternatively, if the basic material to be combined or complexed with the hydrogel is stable at the conditions used for polymerization and cross-linking, such basic material may be added to the mixture of monomers prior to or during polymerization and cross-linking so that the anionic hydrogel is obtained directly in the form of its desired reaction product or complex with such basic material. Alternately one can first form the salt or complex of component (b) — the ethylenically unsaturated monomer which contains an acid group in its molecular structure — with such stable basic (cationic) materials and use such salt or complex as component (b) in the simultaneous polymerization and cross-linking.

Thus the anionic hydrogels of the present invention, in the form of their alkali metal salts may be used as cation exchangers in a manner analogous to cation exchange resins. The anionic hydrogels of this invention are particularly valuable for combination with basic biologically active materials as basic agricultural chemicals, basic drug and other pharmaceuticals, hormones, enzymes and basic cosmetic materials.

As examples of agricultural chemicals which may be combined with the anionic hydrogels of this invention and which are slowly released therefrom under conditions of use, when applied to plants, may be mentioned: such herbicides as Atrazine; 2,4-dichloro-6-(o-chloroanilino)-s-triazine; 2-(ethylamino)-4-(isopropylamino)-6-(methylthio)-s-triazine; 2-chloro-4-ethylamino-6-isopropylamino-s-triazine; 2-t.butylamino-4-ethylamino-6-thio-s-triazine; 2-4-bis (3-methoxypropyl)-amino-6-methylthio-s-triazine; 2-4-bis-(isopropylamino)-6-methoxy-s-triazine; 2-4-bis(isopropylamino)-6-methylthio-s-triazine; and 2-chloro-4,6-bis(isopropylamino)-s-triazine.

As examples of basic pharmaceutical products which may be combined with the anionic hydrogels of this invention may be mentioned: Atropine; Atropine-N-oxide; dextroamphetamine; racemic amphetamine; ephedrine; d-desoxyephedrin; homatropine; imipramine; chlorphenoxamine; phenylephrine; phenmetrazine; phenazocine; procaine; strychnine; etc. Also such basic narcotics as codein and morphine; anticonvulsants as: diphenyl hydantoin; and pro-diphenyl hydantoin:

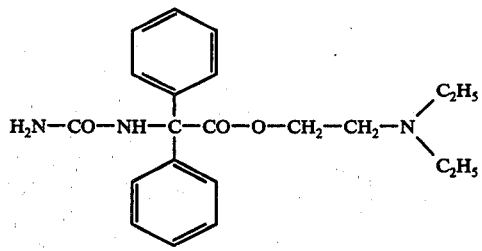

described in C&EN of September 22, 1974, page 26; basic antibiotics as: streptomycin; tetracycline; terramycine and aureomycine; basic hormones as insulin and thyroxin; basic vitamins as Vitamin $K_6$; basic tranquilizers as: promazine; chlorpromazine; dichlorpromazine; prochlorperazine; trifluoperazine; thiopropazate; chlorprothixene; and reserpine; basic antihistamines as: diphenylhydramine; pyrilamine; pheniramine; and chloropheniramine; such glaucoma treating agents as: carbachol; epinephrine or its dipivalate ester known as pro-epinephrine (described in C&EN, Sept. 22, 1974, page 26); and pilocarpine; also basic narcotic antagonists as: cyclazocine (2-cyclopropylmethyl-2'-hydroxy-5,9-dimethyl-6,7-benzomorphan or, using Chem. Abstracts nomenclature and numbering, 1,2,3,4,5,6-hexahydro-6,11-dimethyl-2,6-methano-3-benzazocin-8-ol) and other narcotic antagonists of the general formula (Chem. Abstracts numbering):

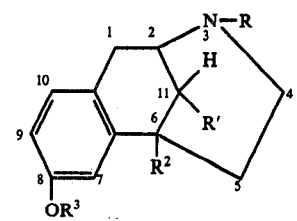

Wherein:
R is a hydrogen radical about 4.4 A in length. e.g., propyl, butyl, cyclopropylmethyl or allyl;
R' and $R^2$ are lower alkyl groups (R' may be H) which may be joined to form a cyclohexane ring;
and $R^3$ is H, alkyl or acyl, i.e., the substituent in 8-position is a hydroxyl, ether or ester group.;
described by S. Archer, N. F. Albertson and A. K. Pierson in a paper entitled "Structure-activity relationships in the opiod antagonists" appearing at pages 25–29 of Agonist Antagonist Actions Narcotic Analg. Drugs, Proc. Int. Symp. 1971, edited by H. W. Kosterlitz and published 1973 by Univ. Park Press, Baltimore, Md.; and by F. M. Robinson in Chapter 3. Analgesics and Narcotic Antagonists at pages 31–38 of Annu. Rep. Med. Chem. 1972.

I claim:
1. The anionic, polymeric hydrogel produced by simultaneous polymerization and cross-linking in the presence of a free radical polymerization catalyst in an amount of from about 0.05 to about 4 weight percent, based on the total weight of monomers, and at a temperature of from about 20° C. to about 125° C., of a mixture consisting essentially of the following monomers:
A. About 40 to about 95 weight percent, based on the total weight of monomers of an acrylic monomer selected from the group consisting of glyceryl monoacrylates and monomethacrylates and acrylic monomers having the formula:

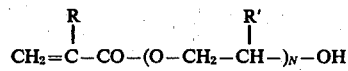

wherein:
R and R' each represents hydrogen or lower alkyl of 1 to about 6 carbon atoms;
N represents an interger of from 1 to about 50;
B. About 50 to about 0.05 weight percent, based on the total weight of monomers, of a monoethylenically unsaturated anionic monomer, capable of copolymerizing with (A), and which contains in its molecular structure a sulfonic acid group and is selected from the group consisting of acrylamido aryl sulfonic acids, acrylamido alkyl sulfonic acids, glycidyl acrylate sulfonic acid, glycidyl methacrylate sulfonic acid, and esters of α-methylene carboxylic acids with hydroxysulfonic acids which esters have the formula:

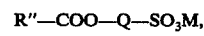

wherein
R" represents a member of the group consisting of vinyl and α substituted vinyl,
Q represents a divalent hydrocarbon radical having its valence bonds on different carbon atoms, and M is a cation, selected from the group consisting of hydrogen, ammonium, amino, alkali metal and alkaline earth metal;

c. about 0.2 to about 12 weight percent, based on the total weight of monomers, of a polymerizable cross-linking agent, capable of copolymerizing with (a) and (b) and having the formula:

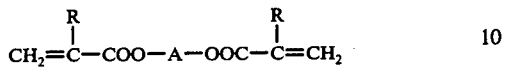

wherein

R represents a member of the group consisting of hydrogen and alkyl of from 1 to about 4 carbon atoms;

A represents alkylene of from 2 to about 10 carbon atoms or a polyglycol ether group of the formula:

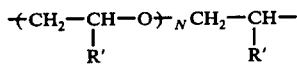

in which;

R' represents a member of the group consisting hydrogen and alkyl of 1 to 2 carbon atoms;

N represents an integer of from 1 to about 20;

d. from 0 to about 50 weight percent, based on the total weight of monomers, of other monoethylenically unsaturated monomers capable of copolymerizing with (A), (B) and (C) and selected from the group consisting of: Acrylamides, Methacrylamides, acrylonitrile, alkyl acrylates, alkyl methacrylates, N-vinyl lactams, N-vinyl succinimide, N-vinyl diglycoylimide, N-vinyl glutarimide, N-vinyl-3-morpholinone, N-vinyl-5-methyl-3-morpholinone and N-vinyl imidazole; Provided that (A) $\geqq$ (D) and (A) + (D) = about 40 to about 95 weight percent; and when an N-vinyl lactam, N-vinyl succinimide, N-vinyl diglycoylimide, N-vinyl glutarimide, N-vinyl-3-morpholinone, N-vinyl-5-methyl-3-morpholinone or N-vinyl imidazole is used it is present in an amount of less than 20 weight percent.

2. The anionic, polymeric hydrogel as defined in claim 1, wherein the acrylic monomer specified as (a) is a hydroxyalkyl acrylate or methacrylate.

3. The anionic, polymeric hydrogel as defined in claim 2, wherein the acrylic monomer specified as (a) is 2-hydroxyethyl methacrylate.

4. The anionic, polymeric hydrogel as defined in claim 1, wherein the polymerizable ethylenically unsaturated monomer containing an acid group specified as (b) is Beta sulfoethyl methacrylate.

5. The anionic, polymeric hydrogel as defined in claim 1, wherein the polymerizable ethylenically unsaturated monomer containing an acid group specified as (b) is glycidyl methacrylate sulfonate.

6. The anionic, polymeric hydrogel as defined in claim 1, wherein the polymerizable ethylenically unsaturated monomer containing an acid group specified as (b) is 2-methacrylamide-2-methylpropane-1-sulfonic acid.

* * * * *

UNITED STATES PATENT AND TRADEMARK OFFICE
CERTIFICATE OF CORRECTION

PATENT NO. : 4,071,508
DATED : Jan. 31, 1978
INVENTOR(S) : Robert Steckler

It is certified that error appears in the above-identified patent and that said Letters Patent are hereby corrected as shown below:

Column 3, line 29, 'polyclycol' should read -- polyglycol --.

Column 4, line 11, "tributyl eneglycol" should read -- tributyleneglycol --.

Column 5, line 42, that portion of Formula 6 reading "$-(CH_2-CH-O-)_n$" should read -- $-(CH_2-\underset{R}{CH}-O-)_n$ --. Column 5, line 53, "or ethy" should read -- or ethyl --. Column 6, line 42, "Pat. No. 3,885,364" should read -- Pat. No. 3,855,364 --. Column 7, line 34, "acrylonitile" should read -- acrylonitrile --. Column 7, line 46, "vinyl butyate" should read -- vinyl butyrate --.

In Claim 1:
Column 14, line 36, "A" should read -- a --. Column 14, line 51, "B" should read -- b --. Column 14, line 54, "(A)" should read -- (a) --. Column 15, line 21, that portion of the formula reading "$-O\}_N$" should read -- $-O\}_n$ --. Column 15, line 28, "N represents" should read -- n represents --. Column 15, line 32, "(A), (B) and (C)" should read -- (a), (b) and (c) --. Column 16, line 6, "(A) $\geq$ (D) and (A) + (D) =" should read -- (a) $\geq$ (d) and (a) + (d) = --.

Signed and Sealed this

Twenty-ninth Day of August 1978

[SEAL]

Attest:

RUTH C. MASON
Attesting Officer

DONALD W. BANNER
Commissioner of Patents and Trademarks